United States Patent [19]

Rodgers

[11] 4,236,414

[45] Dec. 2, 1980

[54] HIGH-G GIMBAL PLATFORM

[75] Inventor: Aubrey Rodgers, Huntsville, Ala.

[73] Assignee: The United States of America as represented by the Secretary of the Army, Washington, D.C.

[21] Appl. No.: 41

[22] Filed: Jan. 2, 1979

[51] Int. Cl.[3] .................... G01C 19/16; G01C 19/26

[52] U.S. Cl. .................... 74/5.1; 74/5.5; 248/583; 308/26

[58] Field of Search .................... 74/5 R, 5.22, 5.1, 5.5; 248/583, 602; 308/26, 184 R; 33/318

[56] References Cited

U.S. PATENT DOCUMENTS

| | | | |
|---|---|---|---|
| 2,872,821 | 2/1959 | Derossi | 74/5.1 |
| 2,986,432 | 5/1961 | Schlauch | 308/184 R |
| 3,802,275 | 4/1974 | Stripling | 74/5 R |
| 4,009,848 | 3/1977 | Albert et al. | 74/5.1 X |
| 4,089,569 | 5/1978 | Rempel | 308/184 R |
| 4,155,521 | 5/1979 | Evans et al. | 74/5.1 X |

*Primary Examiner*—Rodney H. Bonck
*Attorney, Agent, or Firm*—Robert P. Gibson; Harold W. Hilton

[57] ABSTRACT

A platform carried by a rocket projectile for supporting an antenna or other type of terminal homing sensors which are required to survive a high-g launch phase. The platform uses compliant suspension with modified hemispherical support gimbals for bearing protection during a 10,000–12,000 g projectile launch environment. Post-launch lower-g environments permit the compliant suspension to function as a two-degree-of-freedom stabilized platform that can be used for guided projectiles such as the anti-radiation projectile missile.

5 Claims, 4 Drawing Figures

HIGH-G GIMBAL PLATFORM

SUMMARY OF THE INVENTION

A gimbal platform for supporting a load such as an antenna or other type of terminal homing sensor. The platform and load are required to support a high g launch. The system uses a compliant suspension concept wherein each seated gimbal and the platform housing cavity supports the high-g loads rather than the bearings.

BACKGROUND OF THE INVENTION

The high-g (10,000–12,000 g's) gimbal platform concept differs from previously known high-g platform concepts in that it uses bearings that are mounted in a compliant suspension. The compliant suspension concept offers two design options: One, the bearings may be mounted in an elastomeric housing or option 2, the bearings may be secured to a flexible shaft. Bearing protection is accomplished by transferring the applied platform loads through the compliant suspension which allows hemispherical gimbals to move approximately 0.005 inches and seat on the platform housing cavity. The concept allows each seated gimbal and the platform housing cavity to support the high-g loads rather than the bearings. The concept also offers the gimbal cavity design options of using either elastomeric material bonded to the gimbal and platform housing cavities for the purpose of shock absorbers or the cavity design option may allow the use of non-compliant material.

The only two presently known high-g platform concepts offer bearing protection by supporting the gimbal assembly loads through the use of either bearing shaft-to-housing non-compliant structural load absorbers for each gimbal bearing or a non-compliant tube supporting "gotcha" type caging mechanism.

The two-degree-of-freedom gimbal platform can be used to support and stabilize an antenna or any other type of terminal homing sensor required to survive a high-g launch phase and then operate in a stabilized mode. The concept offers the stabilization options of using either an attitude gyro or rate sensors for gimbal stabilization.

One advantage of the platform concept over presently known structures is the large hemispherical support area gained by the use of a simplified bearing compliant suspension. The flexible shaft suspension offers the advantage of no piece part count increase in order to achieve high-g load bearing protection. The elastomeric suspension requires only one additional part per bearing. The compliant suspension with the hemispherical gimbal supports offers a platform concept that shoud reap substantial cost reduction in high-g bearing protection devices. The compliant suspension concept with its low piece part count design lends itself to good high production yields and excellent reliability for high-g environments.

DESCRIPTION OF THE PREFERRED EMBODIMENT

Figure 1:
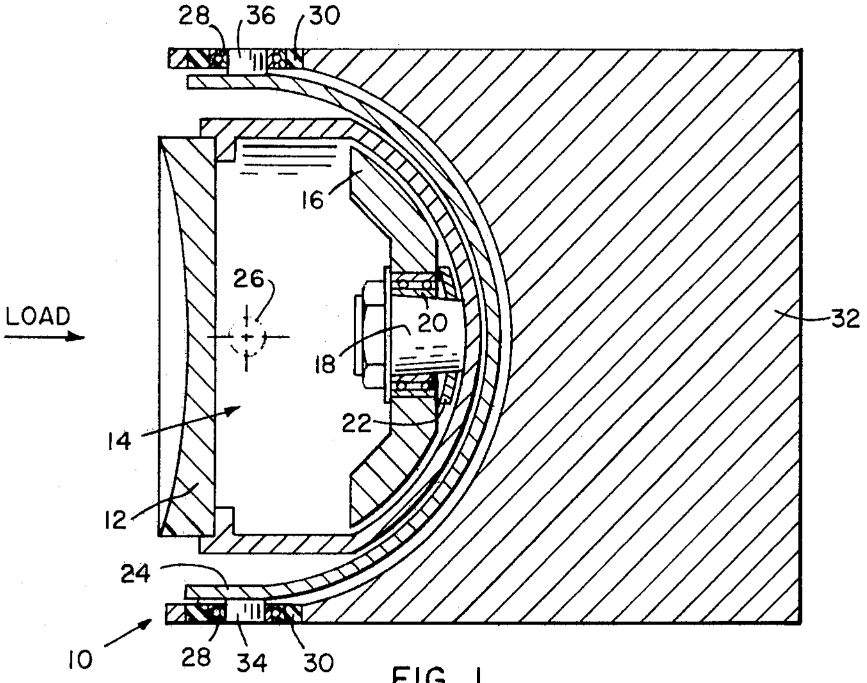
FIG. 1 is a cross sectional elevational view of one gimbal platform arrangement.
Figure 3:
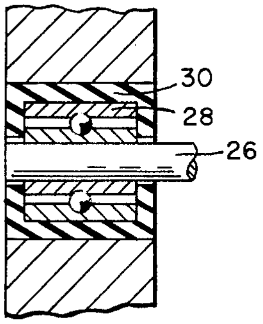
FIG. 3 is a sectional view of the compliant housing around the gimbal shafts.

As seen in FIG. 1, a platform 10 includes an antenna 12 (or sensor) mounted on a hemispherical gimbal 14. A gyro rotor 16 is mounted on a tapered shaft 18 secured to hemispherical gimbal 14. Rotor bearings 20 are carried between the rotor 16 and shaft 18. A compliant spacer 22 is disposed between rotor 16 bearing housing and gimbal 14. The spacer may be elastomeric or a metal bow type washer. Inner gimbal 14 is secured to an outer gimbal 24 by a pair of shafts 26. Both ends of shafts 26 are encompassed by a bearing 28 and an elastomeric member 30 is disposed between the gimbal 24 and bearings 28, as seen in FIG. 3. Outer gimbal 24 is secured to platform housing 32 by a pair of shafts 34 and 36. Compliant spacers 30 are disposed between bearings 28 and platform housing 32.

Figure 2:
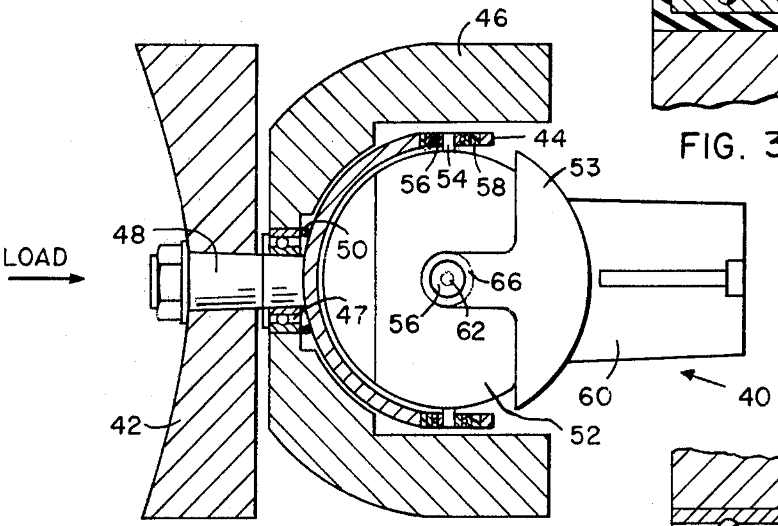
FIG. 2 is cross sectional elevational view of a second gimbal platform assembly.

FIG. 2 illustrates a different arrangement of the platform and gimbals (Hooke's Joint concept). A platform 40 includes an antenna or sensor 42 mounted on a hemispherical gimbal 44. A gyro rotor 46 is mounted on a tapered shaft 48 secured to gimbal 44. Rotor bearings 47 are carried between the rotor 46 and shaft 48. A compliant spacer 50 is disposed between rotor bearings 47 and gimbal 44. The spacer may be elastomeric or a metal bow type washer. An inner gimbal ball 52 is secured to outer gimbal 44 by a pair of shafts 54. Both ends of shafts 54 are encompassed by a bearing 56 and an elastomeric member 58 is disposed between gimbal 44 and bearings 56 (In similar manner as seen in FIG. 3). Outer gimbal 53 is secured to platform housing 60 by a pair of shafts (one shown) 62 and 64. Compliant spacers 66 and 68 are disposed between the bearings 56 and housing as seen in FIG. 3.

Figure 4:
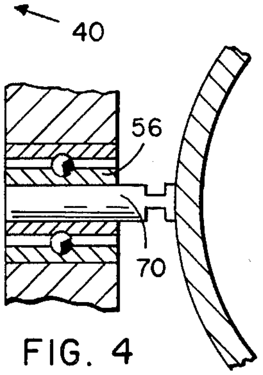
FIG. 4 is a view illustrating the use of a compliant shaft in lieu of the housing of FIG. 3.

FIG. 4 illustrates the use of a flexible shaft 70 in lieu of the complaint housing as set forth in FIG. 3. The flexibility of shaft 70 provides for the required displacement of the gimballed members.

In the embodiment shown in FIG. 1, a high-g load, such as a 155-mm launch, applied to the platform will cause gyro rotor 16 to overcome the spring constant of compliant spacer 22 and consequently move the rotor assembly to rest upon gimbal 14 surface. Simultaneously the entire gimbal load will transfer through the spring constant of the compliant member around each bearing of the gimbal assembly, or the optional flexible shaft 70 (FIG. 4) thus causing hemispherical gimbal 14 to rest upon gimbal 24. Compliant bearing suspension transfers gimbal 24 load to platform housing 10. Thus, the launch loads, both in launch direction and transverse, are supported by the gimbals and the platform housing. After launch, reduced g-loads and compliant suspension spring constant returns the gimbals and gyro rotor to original pre-launch positions. The gimbals are now ready for stabilization.

In the embodiment shown in FIG. 2, the high-g load will cause rotor 46 to compress compliant spacer 50 and seat on gimbal 44. Gimbal 44 load will transfer through compliant suspension 58 and seat on member 52. Member 52 load will transfer through compliant suspension 66 and seat on platform 40. Thus, the high-g load is supported by the gimbals and platform housing. After launch, reduced g-loads and the compliant suspension returns the gimbals and rotor to pre-launch positions. The gimbals are now ready for stabilization.

I claim:

1. A platform assembly disposed for surviving a high-g launch phase comprising:

(a) a platform;

(b) a pair of gimbal members carried in gimballed relation with said platform, said gimbal members being in concentric gimballed relation therebetween;

(c) complaint support means for support of said pair of gimbal members;

(d) a rotor carried supported in one of said gimbal members; and, (e) complaint restraining means disposed between said rotor and said one gimbal member.

2. Apparatus as in claim 1 wherein said complaint support means includes a pair of shafts securing said first and second gimballed members together and a second pair of shafts securing said second gimbal members to said platform, each said shaft having bearing means therearound and elastomeric means around said bearing means.

3. Apparatus as in claim 1 wherein said compliant support means is a flexible shaft.

4. Apparatus as in claim 1 wherein said compliant restraining means is an elastomeric member.

5. Apparatus as in claim 1 wherein said compliant restraining means is a metallic bow-type washer.

* * * * *